(12) United States Patent
Wenlin et al.

(10) Patent No.: US 12,459,781 B2
(45) Date of Patent: Nov. 4, 2025

(54) ELEVATOR BRAKE ARRANGEMENT

(71) Applicant: KONE CORPORATION, Helsinki (FI)

(72) Inventors: Henri Wenlin, Helsinki (FI); Joni Lappalainen, Helsinki (FI); Petri Alkula, Helsinki (FI); Mikko Jussila, Helsinki (FI); Andrej Burakov, Helsinki (FI); Lasse Hurri, Helsinki (FI); Tarmo Torkkeli, Helsinki (FI)

(73) Assignee: KONE CORPORATION, Helsinki (FI)

(*) Notice: Subject to any disclaimer, the term of this patent is extended or adjusted under 35 U.S.C. 154(b) by 937 days.

(21) Appl. No.: 17/165,416

(22) Filed: Feb. 2, 2021

(65) Prior Publication Data

US 2021/0155449 A1 May 27, 2021

Related U.S. Application Data

(63) Continuation of application No. PCT/FI2018/050596, filed on Aug. 22, 2018.

(51) Int. Cl.
*F16D 66/00* (2006.01)
*B66B 1/34* (2006.01)
(Continued)

(52) U.S. Cl.
CPC ............ *B66B 1/365* (2013.01); *B66B 1/3461* (2013.01); *B66B 5/0031* (2013.01); *F16D 55/30* (2013.01); *F16D 65/183* (2013.01); *F16D 65/38* (2013.01); *F16D 66/00* (2013.01); *F16D 2066/003* (2013.01); *F16D 2121/22* (2013.01)

(58) Field of Classification Search
CPC ........ F16D 55/30; F16D 65/183; F16D 65/38; F16D 66/00; F16D 2066/003; F16D 2121/22; B66B 1/365; B66B 1/3461; B66B 5/0031
See application file for complete search history.

(56) References Cited

U.S. PATENT DOCUMENTS 2,914,138 A 11/1959 Borden
5,717,174 A * 2/1998 Ramos ..................... B66D 5/30
187/292
(Continued)

FOREIGN PATENT DOCUMENTS

CN 201309813 Y 9/2009
CN 103527685 A 1/2014
(Continued)

OTHER PUBLICATIONS

Machine translation of DE 2730168 (no date).*
(Continued)

*Primary Examiner* — Nicholas J Lane
(74) *Attorney, Agent, or Firm* — Birch, Stewart, Kolasch & Birch, LLP

(57) ABSTRACT

An elevator brake arrangement includes at least a brake unit including a body, a brake plate assembly, a spring assembly, an electromagnet arrangement and a counter element, and also a rotating brake disc. The brake plate assembly includes at least two brake plates and a state detector that is arranged to monitor the operation states of the brake plates.

17 Claims, 4 Drawing Sheets

Figure 1:
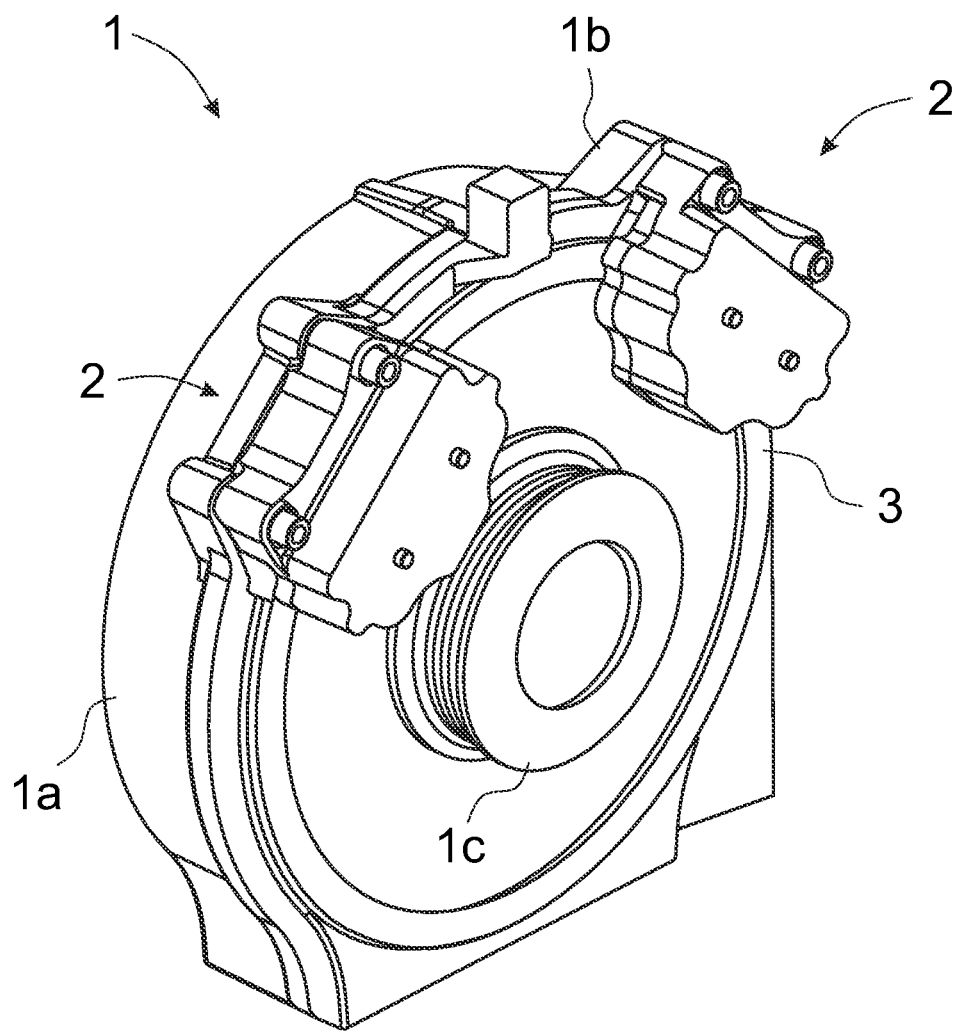

(51) Int. Cl.
*B66B 1/36* (2006.01)
*B66B 5/00* (2006.01)
*F16D 55/30* (2006.01)
*F16D 65/18* (2006.01)
*F16D 65/38* (2006.01)
*F16D 121/22* (2012.01)

(56) References Cited

U.S. PATENT DOCUMENTS

| | | | |
|---|---|---|---|
| 7,591,351 | B2 | 9/2009 | Fischer |
| 9,046,142 | B2 | 6/2015 | Kattainen |
| 11,958,717 | B2* | 4/2024 | Rossi ................... B66B 1/32 |
| 2002/0100646 | A1* | 8/2002 | Maurice ............... H02K 7/1023 |
| | | | 188/161 |
| 2005/0087407 | A1 | 4/2005 | Fischer |
| 2009/0218182 | A1* | 9/2009 | Klingler ................. F16D 59/02 |
| | | | 188/171 |
| 2013/0299281 | A1 | 11/2013 | Lähteenmäki et al. |
| 2014/0291075 | A1 | 10/2014 | Vlasov |
| 2015/0114762 | A1 | 4/2015 | Olkkonen et al. |
| 2017/0363163 | A1* | 12/2017 | Sanchez Criado ..... F16D 65/18 |
| 2019/0264764 | A1* | 8/2019 | Lin ....................... F16D 66/027 |

FOREIGN PATENT DOCUMENTS

| | | | | |
|---|---|---|---|---|
| DE | 2730168 | A * | 1/1979 | ............ F16D 55/28 |
| EP | 1 411 018 | A2 | 4/2004 | |
| EP | 1 701 904 | B1 | 11/2011 | |
| JP | 2006-52035 | A | 2/2006 | |
| JP | 2006-335547 | A | 12/2008 | |
| KR | 10-2017-0050466 | A | 5/2017 | |
| WO | WO 00/20320 | A1 | 4/2000 | |

OTHER PUBLICATIONS

International Search Report for PCT/FI2018/050596 (PCT/ISA/210) mailed on Feb. 27, 2019.
International Search Report for PCT/FI2018/050597 (PCT/ISA/210) mailed on Mar. 1, 2019.
Written Opinion of the International Searching Authority for PCT/FI2018/050596 (PCT/ISA/237) mailed on Feb. 27, 2019.
Written Opinion of the International Searching Authority for PCT/FI2018/050597 (PCT/ISA/237) mailed on Mar. 1, 2019.
U.S. Office Action for U.S. Appl. No. 16/547,311, dated Mar. 1, 2022.
U.S. Notice of Allowance for U.S. Appl. No. 16/547,311, dated Dec. 30, 2022.
U.S. Office Action for U.S. Appl. No. 16/547,311, dated Jul. 18, 2022.

\* cited by examiner

ELEVATOR BRAKE ARRANGEMENT

CROSS REFERENCE TO RELATED APPLICATIONS

This application is a Continuation of PCT International Application No. PCT/FI2018/050596, filed on Aug. 22, 2018, which is hereby expressly incorporated by reference into the present application.

The present invention relates to an elevator brake arrangement as defined in the preamble of claim 1.

When moving people up and down, like in various elevator arrangements, the passenger safety is the most important aspect. It must be controlled that the elevator car cannot fall freely downwards or move uncontrolled upwards. Also, all accelerations and decelerations must be kept in certain safe limits. Sudden stops even from small speeds can cause injuries for the passengers.

For the reasons mentioned above the authorities in different countries have various regulations related to elevator safety issues. The basic principle is that the brake arrangement of an elevator must be able to stop the elevator car from its nominal speed and keep the elevator car in its position in a floor also in overload situations. In addition, the brake arrangement must be fault tolerant so that one mechanical fault is not able to make the brake arrangement totally inoperative.

Among other things, some safety regulations request that the elevator brake must be mechanically doubled so if one part of the brake failures another part of the brake still works properly. Mechanically doubled elevator brakes are used in normal operation so that both the brakes are always used at the same time. A problem with this kind of a use is that a mechanical failure of one of the brakes in the pair is not necessarily discovered. In that case the elevator may operate a long time hinging on one brake only. This may cause surprisingly dangerous situations.

Some other safety regulations request that the elevator must have one driving machine brake and one emergency brake. In some solutions safety brakes, operating in contact with elevator guide rails, act as emergency brakes. If the driving machine brake failures the safety brake has to stop the elevator car within a predetermined displacement so that an uncontrolled acceleration of the elevator car will not arise. A problem with this solution is that the emergency brake is activated only when a considerable speed or acceleration has been achieved and a dangerous situation has grown up. The emergency brake can prevent fatal injuries of the passengers, but it is not able to prevent down fallings and/or all nonfatal injuries.

In addition, one problem with the prior art solutions is a need of a big place box depending on the considerably big structure of the brake arrangement.

One object of the present invention is to eliminate drawbacks of prior art technology and to achieve a safe and reliable elevator brake arrangement with relatively small-sized brake units. The elevator brake arrangement according to the invention is characterized by what is disclosed in the characterization part of claim 1. Other embodiments of the invention are characterized by what is disclosed in the other claims.

The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. Likewise, the different details presented in connection with each embodiment can also be applied in other embodiments. In addition, it can be stated that at least some of the subordinate claims can, in at least some situations, be deemed to be inventive in their own right.

An aspect of the invention is to provide an elevator brake arrangement, which arrangement comprises at least a brake unit comprising a body, a brake plate assembly, a spring assembly, an electromagnet arrangement and a counter element, and also a rotating brake disc. Advantageously, the brake plate assembly comprises at least two brake plates and a state detector that is arranged to monitor the operation states of the brake plates.

In order to be able to monitor the operation states of the brake plates the state detector is arranged to measure an instantaneous position of each brake plate in relation to the brake disc. The position here means an instantaneous distance of each brake plate from the brake disc.

A disc brake type brake unit according to the invention is advantageously used as an elevator driving machine brake unit to decelerate and stop the elevator car movement and/or to keep the elevator car in its position during loading and unloading phases and also when being out of use. However, the disc brake unit according to the invention can also be used for various other purposes to stop rotational or linear movements or to prevent an object from moving. Later in this context the term elevator driving machine brake unit or brake caliper is also called shorter only the brake unit.

The invention relates to an elevator brake arrangement with at least one two-plate brake unit that comprises means for monitoring operation states of the two brake plates. In the arrangement the required states of the brake plates of the two-plate brake unit are preferably monitored with a single state detector. The state detector is arranged to provide a signal on the grounds of which it can be deduced which one of the two brake plates are currently braking, are both the brake plates currently braking or are both the brake plates currently free from braking. Thus, the purpose of the monitoring is to secure the reliable operation of the brake unit by checking if both the brake plates are working properly, abnormally or if they do not work at all.

The invention makes it possible to utilize proximity switches as state detectors or sensors in dramatically smaller space boxes than in prior art solutions.

One advantage of the invention is that the elevator disc brake arrangement according to the invention is reliable, cost effective and requires only a little space. Another advantage is higher ride comfort due to decreased deceleration fluctuation as well as a quieter operation of the brakes. Yet another advantage is that the small and simple brake unit is easy to adjust and maintain. Yet one advantage is a robust cast design, resulting in a smaller and cheaper solution, having also more degrees of freedom in the outer shape of the brake unit. In addition, the disc brake arrangement according to the invention has a non-coinciding torque and hence deceleration minimum, resulting in a more stable overall torque. And yet one more advantage is that the cast design has also more degrees of freedom in the dimensioning of the brake unit, making the fulfillment of the space box requirements easier. Yet a further advantage is that thanks to several brake plates a failure of a brake part decreases the usable brake moment only a little, and the brake arrangement remains operable. Yet one more advantage is that smaller brake units lead to a machinery with smaller deceleration, which further leads to better safety and comfort, as well as a smaller space box and price of the brake arrangement.

In an advantageous embodiment two brake units are attached to the drive machine frame by lugs or other type attaching interfaces. Advantageously each of the brake units comprises two brake plates, the brake plates are arranged to be move between braking contact with the brake disc and a noncontact position apart from the brake disc. In each of the brake units a state detector is arranged to monitor the operation states of the brake plates.

Figure 2:
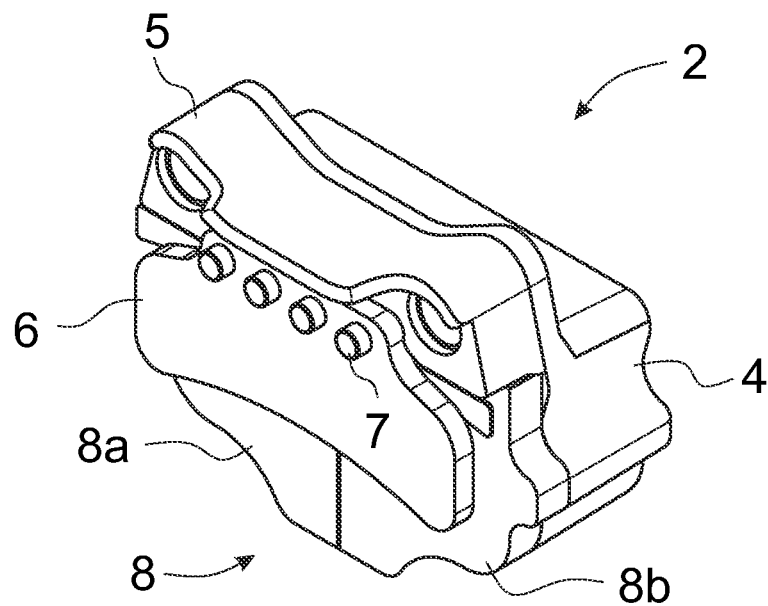
Figure 3:
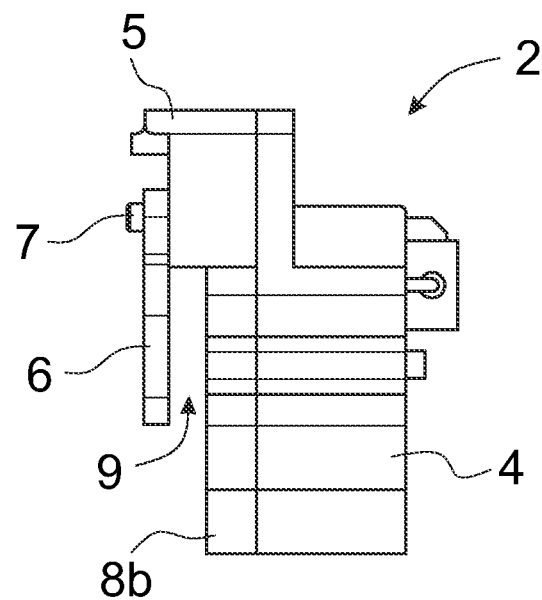
Figure 4:
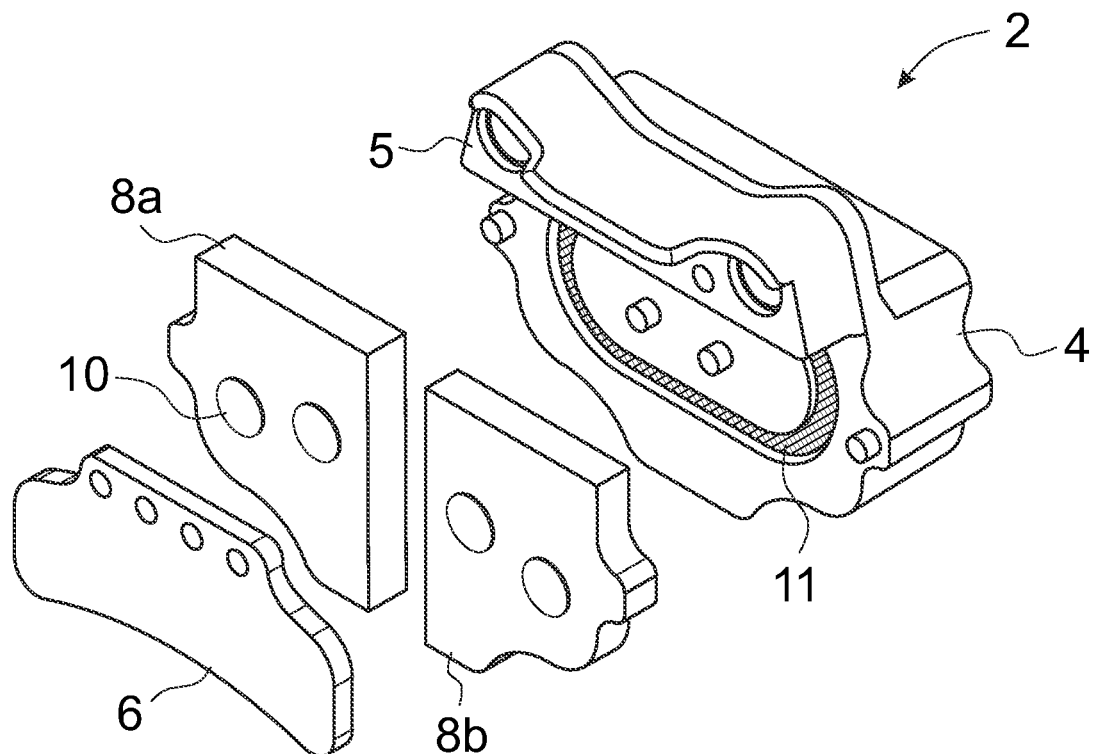
Figure 5:
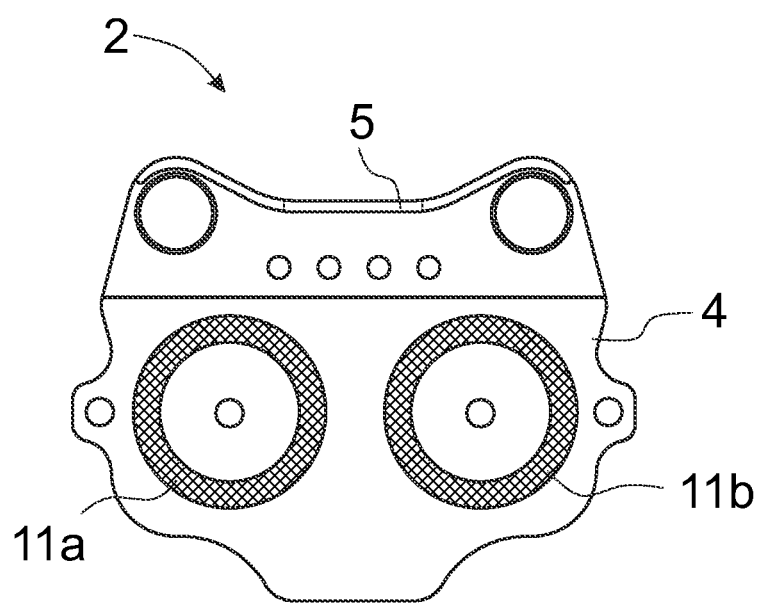
Figure 6:
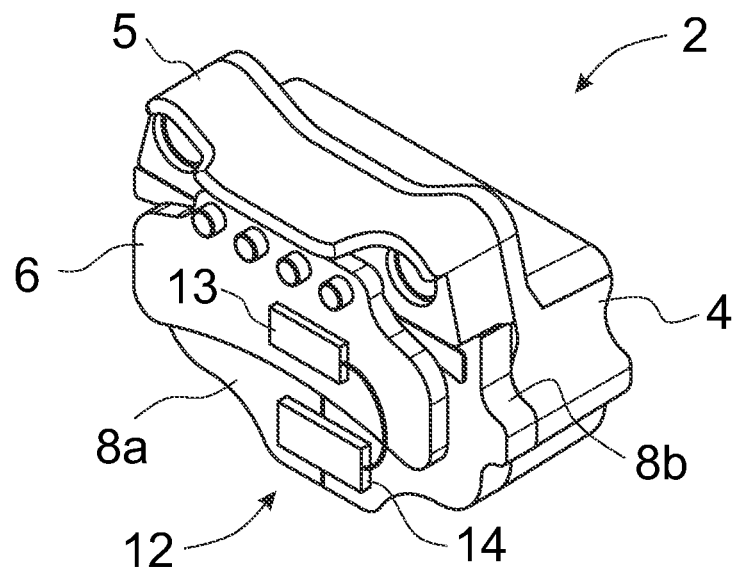
Figure 7:
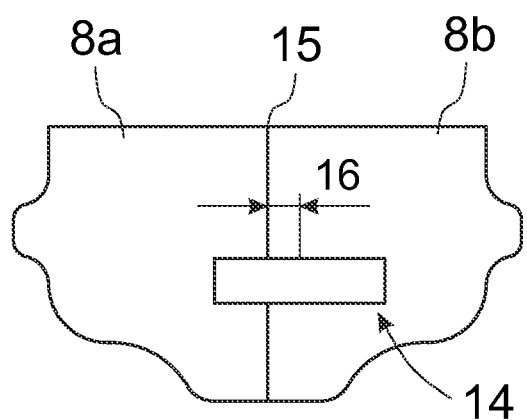
Figure 8:
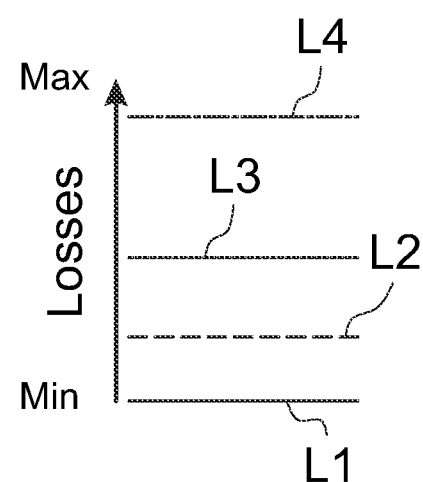

In the following, the invention will be described in detail by the aid of example embodiments by referring to the attached simplified and diagrammatic drawings, wherein FIG. 1 presents in a simplified and diagrammatic oblique top view an elevator machinery with two driving machine brake units according to the invention, FIG. 2 presents in a simplified and diagrammatic oblique top view a driving machine brake unit according to the invention, FIG. 3 presents in a simplified and diagrammatic end view the driving machine brake unit according to FIG. 2, FIG. 4 presents in a simplified and diagrammatic oblique top view the driving machine brake unit according to FIG. 2 as an exploded view with only main components shown, FIG. 5 presents in a simplified and diagrammatic front view another advantageous embodiment of the driving machine brake unit according to the invention without brake plates and a counter element, FIG. 6 presents in a simplified and diagrammatic oblique top view yet another embodiment of the driving machine brake unit according to the invention, FIG. 7 presents in a simplified and diagrammatic front view a proximity sensor, used in an advantageous embodiment of the invention, in its position in relation to the brake plates of a driving machine brake unit according to the invention, and FIG. 8 presents in a simplified and diagrammatic view eddy-current losses in four different main states of the brake plate combination according to the invention.

FIG. 1 presents in a simplified and diagrammatic oblique top view an elevator driving machinery 1, which comprises at least a housing 1a, a drive motor, a traction sheave 1c, two driving brake units 2 and a brake disc 3. The drive motor is inside the machinery housing 1a and is arranged to rotate simultaneously the coaxial traction sheave 1c and brake disc 3. The brake units 2 are fastened floatably to fastening lugs 1b on the outer periphery of the housing 1a. The brake units 2 have been arranged to decelerate and stop the rotational movement of the brake disc 3 and at the same time also the rotational movement of the traction sheave 1c. The brake units 2 act also as holding brakes to keep the elevator car in its position during loading and unloading phases and also when being out of use, as mentioned earlier. The brake units 2 can also be called brake calipers as also mentioned earlier.

FIG. 2 presents in a simplified and diagrammatic oblique top view a driving machine brake unit 2 according to the invention. Among other things the brake unit 2 comprises a body 4, a top element 5, a counter element 6 with its fastening screws 7 and a brake plate assembly 8 having two separate brake plates 8a, 8b. The counter element 6 can be also called a caliper plate. The body 4 forms a hollow housing inside which a spring assembly for pressing the brake plates 8a, 8b towards the counter element 6 and brake disc 3 is placed. Also, an electromagnet arrangement comprising a coil assembly causing a magnetic field for pulling the brake plates 8a, 8b free from the brake disc 3 when the brake is opened is placed inside the body 4. For the sake of clarity, the spring assembly and electromagnet arrangement are not presented in FIG. 2.

The brake unit 2 according to the invention is arranged to operate so that when the electromagnet arrangement comprising the coil assembly is powered the brake plates 8a, 8b are pulled against the body 4 of the brake unit 2 free from the brake disc 3. In that case the brake is open and the brake disc 3 and the traction sheave 1c can be rotated. In this operation state of the brake also both the brake plates 8a, 8b are said to be open. The brake is activated or closed by switching the power off from the electromagnet arrangement. In that case the spring assembly presses the brake plates 8a, 8b against the brake disc 3.

The top element 5 forms an intermediate element between the body 4 of the brake unit 4 and the fastening lugs 1b in the housing 1a of the driving machinery 1 to which lugs 1b the brake units 2 are to be floatably fastened so that the brake units 2 are able to move properly when needed in the axial direction of the elevator driving machinery 1.

FIG. 3 presents in a simplified and diagrammatic end view the driving machine brake unit 2 according to FIG. 2. The figure shows a gap 9 between the counter element 6 and the brake plates 8a, 8b. The gap 9 is for the brake disc 3. The brake unit 2 is mounted into its operating location so that the outer circumference of the brake disc 3 is in the gap 9 between the counter element 6 and the brake plates 8a, 8b. Thus, the counter element 6 is arranged to press against the first brake surface of the brake disc 3 on the first side of the brake disc 3, and the brake plates 8a, 8b are arranged to press against the second brake surface of the brake disc 3 on the second side of the brake disc 3.

FIG. 4 presents in a simplified and diagrammatic oblique top view the driving machine brake unit 2 according to FIG. 2 as an exploded view with only main components shown. For the sake of clarity, the brake plates 8a, 8b are slightly separated from each other. The brake plates 8a, 8b are substantially flat plates comprising a group of friction pads or linings 10 on the surface that is facing to the rotating brake disc 3. The counter element 6 comprises substantially similar friction pads or linings on its surface that is facing to the rotating brake disc 3. Those pads or linings are not presented in figures.

Preferably, the size and shape of the brake plates 8a, 8b are substantially equal but the thickness is different so that, for example, the first brake plate 8a is thicker than the second brake plate 8b. For that reason, the horizontal gap between the braking surface of the first brake plate 8a and the braking surface of the brake disc 3 is smaller than the corresponding gap between the braking surface of the second brake plate 8b and the braking surface of the brake disc 3. That feature makes it possible to achieve a sequential brake arrangement where the brake plates 8a, 8b hit the brake disc 3 at a different time, one after the other. Due to a smaller gap the first brake plate 8a hits the brake disc 3 slightly earlier than the second brake plate 8b when a braking is actuated and the brake is closed by the spring assembly after the magnetic force provided by the coil assembly is weakened or removed. This sequential braking arrangement gives a higher ride comfort due to decreased deceleration fluctuation, as well as a quieter operation because there are only two minor clicks instead of one louder slam.

FIG. 4 also presents a coil 11 of the coil assembly for an electromagnet arrangement that is arranged to open the brake by pulling the brake plates 8a, 8b free from the brake disc 3. The electromagnet arrangement is placed inside the body 4. In this embodiment the body 4 comprises only one coil 11 that is common for both the brake plates 8a, 8b. Therefore, the coil 14 extends, preferably symmetrically, to the area of each brake plate 8a, 8b and is arranged to interact with both the brake plates 8a, 8b.

FIG. 5 presents in a simplified and diagrammatic front view another advantageous embodiment of the driving machine brake unit 2 according to the invention without the brake plates 8a, 8b and the counter element 6. The structure of this embodiment is otherwise similar to the structure of the embodiment according to FIG. 4 but now the coil assembly of the brake unit 2 comprises a separate coil 11a, 11b for each brake plate 8a, 8b. Preferably in this embodiment the brake arrangement comprises adjusting means for adjusting each brake plate 8a, 8b separately. Thus, the first brake plate 8a is interacted by the first coil 11a and the second brake plate 8b is interacted by the second coil 11b. In this embodiment the operation of the two brake plates 8a, 8b can be freely adjusted.

FIGS. 6-8 present in a simplified and diagrammatic view yet another advantageous embodiment of the driving machine brake unit 2 according to the invention. In this embodiment a single detector 12 comprising at least a processor unit 13 and an antenna 14 is used as a state indicator to make monitoring the operation states of the brake unit 2 possible by measuring instantaneous locations of the two brake plates 8a, 8b in relation to the brake disc 3. Advantageously, the state detector 12 is a proximity sensor. The term "operation state" in this context preferably means a horizontal distance of the brake plates 8a, 8b from the brake disc 3.

FIG. 6 presents the state detector 12 fastened to its place in the brake unit 2, and FIG. 7 presents in a simplified and diagrammatic front view the antenna 14 of the state detector 12 in its offset position in relation to the brake plates 8a, 8b of the driving machine brake unit 2 according to the invention. FIG. 8 presents measured eddy-current losses in four different main operation states of the brake unit 2 or the brake plates 8a, 8b.

An advantageous monitoring system for the operation states of the brake unit 2 according to the invention comprises a single state detector 12, such as a proximity sensor, having an LC resonator circuit that is arranged to provide a vibrating magnetic field in its vicinity. When the brake is open both the brake plates 8a, 8b are at their maximum distance from the brake disc 3. In that case the losses in the magnetic field provided by the LC resonator circuit are minimal, almost non-existent. When the brake is closed for the braking operation both the brake plates 8a, 8b have come closer to the state detector 12. In that case a large portion of the flux of magnetic field goes through the brake plates 8a, 8b causing eddy-currents that are subject to damp because of the resistance of the material of the brake plates 8a, 8b. The processor unit 13 of the state detector comprises measuring means to measure the dampening by measuring losses in eddy-currents. The losses are at their minimum when the brake is open and at their maximum when the brake is closed and the brake plates 8a, 8b are close to the state detector 12.

Advantageously, the processor unit 13 of the state detector 12 is fastened, for example, to the counter element 6, and the antenna 14 is placed so that it is able to receive the signal emitted by the LC resonator circuit in order to obtain the instantaneous operation states of the two brake plates 8a, 8b. The state detector 12 or at least its antenna 14 is placed in the brake unit 2 with an offset 16 in relation to the line 15 of the facing surfaces of the brake plates 8a, 8b. The offset 16 is essential because it makes it possible to separate the proximity or the operation state of the first brake plate 8a from the proximity or the operation state of the second brake plate 8b. In that case an adequate number of operation states, namely four main operation states, are obtained to reliably monitor the functions of the brake units 2.

The four main operation states obtained are:
Os1. Both brakes plates 8a, 8b open: Losses minimum=L1
Os2. The first brake plate 8a closed: Losses small=L2
Os3. The second brake plate 8b closed: Losses medium=L3
Os4. Both brakes plates 8a, 8b closed: Losses maximum=L4

The four operation states Os1-Os4 of the brake can be deduced by the single state detector 12 that is placed in the brake unit 2 with an offset 16 in relation to the line 15 of the facing surfaces of the brake plates 8a, 8b. For the deduction the losses in the vibrating magnetic field created by the LC resonator are measured.

FIG. 8 presents an example of the measured losses in the four operation states Os1-Os4 mentioned above. Line L1 indicates that the losses are minimal, either zero or almost zero. The measured value of L1 tells that both the brakes plates 8a, 8b are open, and in the operation state Os1. In that case the brake is open.

Correspondingly, the measured value of L2 is relatively small that tells that the first brake plate 8a is close to the brake disc 3 but the second brake plate 8b is further, closer to the body 4 of the brake unit 2. In that case it can be said that the first brake plate 8a is closed and the second brake plate 8b is open. The small value of L2 is based on the smaller resistance because only a smaller area of the antenna 14 is facing the closer brake plate that is now the first brake plate 8a.

Further, the measured value of L3 indicates medium losses telling that the second brake plate 8b is close to the brake disc 3 but the first brake plate 8a is further, closer to the body 4 of the brake unit 2. In that case it can be said that the second brake plate 8b is closed and the first brake plate 8a is open. The medium value of L3 is based on the greater resistance because a greater area of the antenna 14 is facing the closer brake plate that is now the second brake plate 8b. This is clearly seen in FIG. 7.

Finally, the measured value of L4 is relatively great and tells that there is a lot of material causing a great deal of losses to the eddy-currents. This means that both the brake plates 8a, 8b are close to the brake disc 3, and, as a matter of fact, the brake is closed. The measured value L4 of the losses is substantially equal to the sum of measured losses L2 and L3, i.e. L4≈L2+L3.

The monitoring arrangement mentioned above can be applied with proximity sensors that are placed so that when the braking is activated the brake plates 8a, 8b come closer to the sensor and/or its antenna 14, and when the brake is open the brake plates 8a, 8b are further from the sensor and/or its antenna 14. With other types of sensors or other kinds of positioning the sensors, the monitoring arrangement may be different.

In general, it is characteristic to the arrangement according to the invention that each brake unit 2 comprises at least two separate brake plates 8a, 8b that are placed one after the other or adjacent to each other in the direction of rotation of the brake disc 3. In that case both the brake plates 8a, 8b are on the same side of the brake disc 3. Preferably each brake unit 2 comprises a single state detector 12, such as the proximity sensor with its processor unit 13 and antenna 14 as mentioned above, or a corresponding assembly, to measure and monitor the instantaneous operation states of the brake plates 8a, 8b. The instantaneous operation states correspond instantaneous distances of both the brake plates 8a, 8b from the brake disc 3. Preferably, the instantaneous distances of both the brake plates 8a, 8b from the brake disc 3 are measured, and based on the measuring results the monitoring is applied.

Also essential is the asymmetrical positioning of the state detector 12 or at least its antenna 14. By doing so, adequate measuring results can be obtained with a simpler way. The corresponding results can be obtained also by using sensors with a non-homogenous field distribution. In that case the asymmetrical positioning of the sensor and/or its antenna is not necessary. The thickness of the brake plates 8a, 8b can also be equal when using a non-homogenous field distribution.

Thus, as mentioned earlier, the state detector 12 is arranged to recognize also which one of the brake plates 8a, 8b is closed and which one is open, utilizing either the offset 16 of the antenna 14 or the non-homogenous field distribution or both, or some other advantageous arrangement. The open and closed states have been described above.

Instead of proximity sensors also other advantageous sensors or detectors may be used to measure the operation states of the brake plates 8a, 8b.

It is obvious to the person skilled in the art that the invention is not restricted to the examples described above but that it may be varied within the scope of the claims presented below. Thus, for instance, the structures and components of the brake units may differ from what is presented above. In that case the brake plates can also be somewhere else than in the outer periphery of the brake disc. The brake plates can be, for example, on the side face of the brake disc and at maximum one brake plate can be a semicircle or almost a semicircle.

The invention claimed is:

1. An elevator brake arrangement, comprising:
a body,
a brake plate assembly,
a spring assembly,
an electromagnet arrangement and a counter element, and
a rotating brake disc,
wherein the brake plate assembly comprises at least two separate brake plates and a state detector,
wherein the state detector comprises an antenna arranged to monitor operation states of more than one of the at least two brake plates.

2. The elevator brake arrangement according to claim 1, wherein the state detector is arranged to measure an instantaneous position of each brake plate in relation to the brake disc.

3. The elevator brake arrangement according to claim 1, wherein the state detector comprises a proximity sensor.

4. The elevator brake arrangement according to claim 1, wherein the state detector is arranged to recognize which one of the brake plates is closed and which one is open.

5. The elevator brake arrangement according to claim 1, wherein the antenna is placed with an offset in relation to a position of the brake plates.

6. An elevator brake arrangement, comprising:
a body;
a brake plate assembly;
a spring assembly;
an electromagnet arrangement and a counter element; and
a rotating brake disc,
wherein the brake plate assembly comprises at least two separate brake plates and a state detector that is arranged to monitor the operation states of the at least two separate brake plates,
wherein the state detector comprises an antenna that is placed with an offset in relation to the position of the at least two separate brake plates, and
wherein a smaller area of the antenna overlaps the first brake plate in the direction of movement of the brake plate assembly and a greater area of the antenna overlaps the second brake plate in the direction of movement of the brake plate assembly.

7. The elevator brake arrangement according to claim 1, wherein the state detector is arranged to recognize which one of the brake plates is closed and which one is open by utilizing a non-homogenous field distribution.

8. The elevator brake arrangement according to claim 1, wherein the state detector is arranged to detect at least four different operation states of the brake plates.

9. The elevator brake arrangement according to claim 8, wherein the at least four different operation states of the brake plates are as follows: both the brake plates are open, the first brake plate is closed and the second brake plate is open, the second brake plate is closed and the first brake plate is open, and both the brake plates are closed.

10. The elevator brake arrangement according to claim 1, wherein one of the brake plates is arranged to hit the brake disc earlier than the other brake plate when a braking is actuated.

11. The elevator brake arrangement according to claim 1, wherein the brake plates are unequal in their thickness.

12. The elevator brake arrangement according to claim 1, wherein the electromagnet arrangement comprises a coil that is in common with both the brake plates.

13. The elevator brake arrangement according to claim 1, wherein an electromagnet arrangement comprises a separate coil for each brake plate.

14. The elevator brake arrangement according to claim 13, wherein the brake arrangement comprises an adjuster configured to adjust each brake plate separately.

15. The elevator brake arrangement according to claim 2, wherein the state detector comprises a proximity sensor.

16. The elevator brake arrangement according to claim 1, wherein the antenna is attached to a processor.

17. The elevator brake arrangement according to claim 16, wherein the counter element is spaced from the brake plate assembly in a direction of movement of the brake plate assembly, and
wherein the rotating brake disc is in a gap between the brake plate assembly and the counter element.

* * * * *